United States Patent [19]

Thévenin et al.

[11] Patent Number: 4,495,138

[45] Date of Patent: Jan. 22, 1985

[54] JUNCTION DEVICE BETWEEN THE DELIVERY DUCT OF A PRIMARY PUMP AND A DUCT JOINED TO THE CORE SUPPORT OF A FAST NEUTRON NUCLEAR REACTOR

[75] Inventors: Michel Thévenin, Fresnes; Georges Jullien, St Michel sur Orge, both of France

[73] Assignee: Novatome, Le Plessis Robinson, France

[21] Appl. No.: 377,483

[22] Filed: May 12, 1982

[30] Foreign Application Priority Data

Jun. 19, 1981 [FR] France .............................. 81 12084

[51] Int. Cl.³ .............................................. G21D 1/04
[52] U.S. Cl. .................................... 376/203; 285/165;
376/292; 376/404
[58] Field of Search .............................. 376/403–405,
376/203, 291, 292; 285/165, 164, 163, 334.3, 425

[56] References Cited

U.S. PATENT DOCUMENTS

| | | | |
|---|---|---|---|
| 1,924,657 | 8/1933 | Saine et al. | 285/334.3 X |
| 2,955,850 | 10/1960 | Bellinger | 285/165 X |
| 4,258,937 | 3/1981 | Barneoud et al. | 285/164 X |
| 4,285,770 | 8/1981 | Chi et al. | 376/203 X |
| 4,294,472 | 10/1981 | Stolecki | 285/165 X |
| 4,348,353 | 9/1982 | Christiansen et al. | 376/364 |
| 4,351,794 | 9/1982 | Artaud et al. | 376/405 X |

Primary Examiner—Donald G. Kelly
Assistant Examiner—John S. Maples
Attorney, Agent, or Firm—Pollock, Vande Sande & Priddy

[57] ABSTRACT

A junction device between the delivery duct of a primary pump and a duct joined to the core support of a liquid metal cooled fast neutron nuclear reactor comprises a frusto-conical sleeve (6) widening out towards the inlet (2) of the duct joined to the core support, a connecting member (7) joined to the sleeve (6), a sealing device (18) interposed between the outlet end of the sleeve (6) and the inlet (2) of the duct joined to the core support, and an elastic means (6) interposed between the outlet end of the sleeve (6) and a support member joined to the core support. In its central portion the connecting member (7) carries the movable portion (14) of an articulated connection element the fixed portion (16) of which is carried by the pump. On its periphery this member (7) is connected sealingly and articulatedly to the delivery duct of the pump at the level of a spherical surface (9). The sleeve can move freely in the axial direction (5) and without giving rise to substantial stresses in the transverse directions.

3 Claims, 1 Drawing Figure

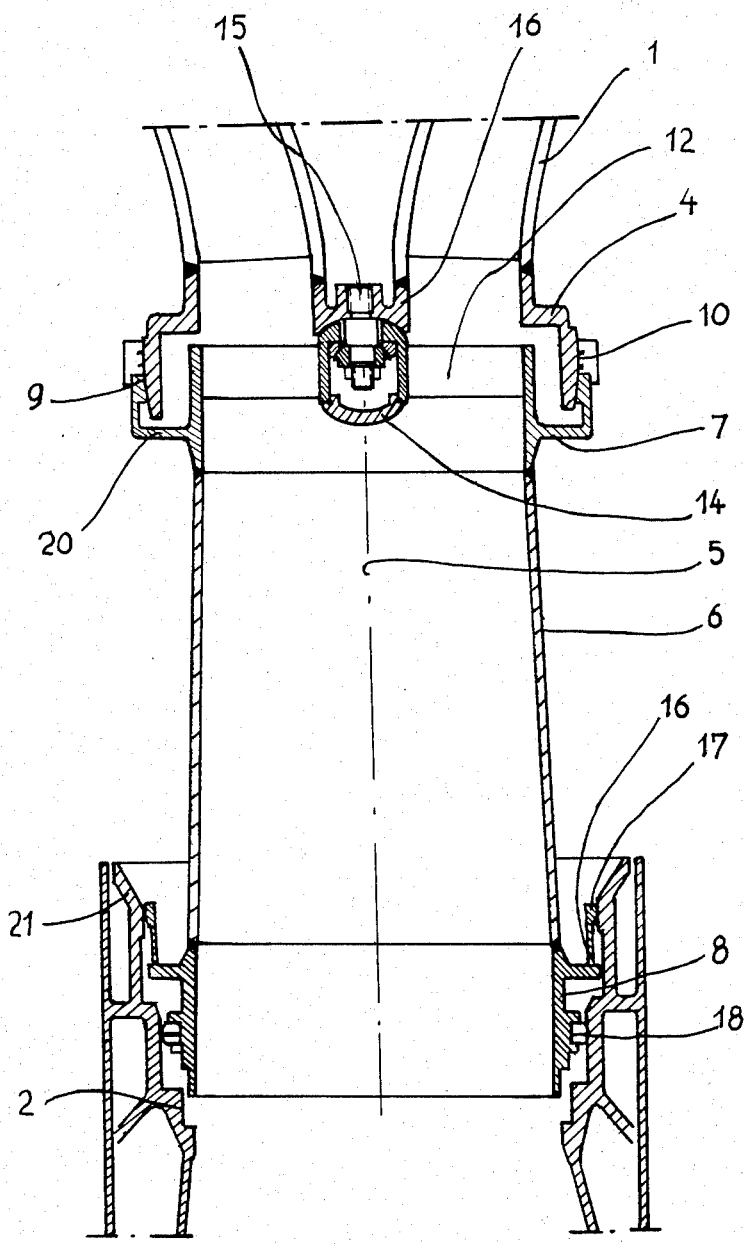

JUNCTION DEVICE BETWEEN THE DELIVERY DUCT OF A PRIMARY PUMP AND A DUCT JOINED TO THE CORE SUPPORT OF A FAST NEUTRON NUCLEAR REACTOR

SUMMARY OF THE INVENTION

The invention relates to a junction device between the delivery duct of a primary pump and a duct joined to the core support of a liquid metal cooled fast neutron nuclear reactor.

BACKGROUND OF THE INVENTION

In a liquid metal cooled fast neutron nuclear reactor, the liquid metal constitutes the primary fluid permitting the cooling of the fuel element assemblies which give off heat and which form the core of the reactor.

The heat from the core is taken off by the liquid metal, generally liquid sodium, which is pumped to the bottom of the core by the primary pumps, which may be immersed in the liquid sodium filling the reactor vessel in the case of an integrated nuclear reactor, or be disposed outside the vessel in the case of a loop type nuclear reactor.

The liquid sodium heated by the reactor core enters heat exchangers permitting the heating of a second liquid metal constituting the secondary fluid, which in turn is used to produce steam in the steam generators.

On leaving the heat exchangers, the cooled primary fluid enters a zone of the vessel where, with the aid of the primary pumps, it is re-injected at the base of the reactor core.

The sodium cooled in the heat exchangers, i.e., cold sodium, is nevertheless at a temperature higher than 300°, so that the primary pumps undergo expansions when the nuclear reactor is in operation.

Furthermore, the temperature of the primary fluid is not constant in the course of the operation of the reactor, and consequently the expansion of the different parts of the pump is variable.

In addition, the pumps and their accessories undergo vibrations, which are in particular due to the circulation of the liquid sodium at high speed.

In nuclear reactors of the integrated type, and in particular, in which the primary pumps inject the liquid metal into ducts joined to the core support, it is necessary to assure continuity of circulation of this liquid sodium between the pump and the duct joined to the support, and at the same time to permit displacements of the pump relative to the core support or bed on which the fuel element assemblies rest and which enables them to be supplied with sodium.

In order to carry out these functions, use is generally made of a connecting sleeve having its ends fixed on the pump delivery duct and on the bed respectively, in a non-rigid manner, and leading into the duct joined to the bed.

A cylindrical sleeve of this kind nevertheless does not enable the speed of flow of the liquid metal to be controlled before it is injected into the duct joined to the bed.

Moreover, in order to permit transverse displacements relative to the flow, it is necessary to provide a universal joint arrangement for the entire pump, thereby complicating the construction and the fastening of the latter.

Finally, it is not possible to mount the pump sufficiently flexibly to absorb the displacements and at the same time sufficiently rigidly and with sufficient mechanical strength to withstand the various stresses (particularly earthquakes).

OBJECT OF THE INVENTION

An object of the invention is therefore a junction device between the delivery duct of a primary pump and a duct fastened to the core support of a liquid metal cooled fast neutron nuclear reactor, in which the liquid metal constituting the primary fluid of the reactor is pumped to the base of the core by primary pumps which inject the liquid metal into ducts joined to the core support for the purpose of cooling the core, this junction device permitting adequate displacements of the pump relative to the core support during the operation of the reactor while assuring a stable junction and withstanding mechanical stresses, particularly vibrations, and effecting a degree of regulation of the speed of the liquid metal before its injection into the duct joined to the core support.

To this end, the junction device according to the invention comprises:

- a sleeve of frusto-conical shape disposed as an extension of the pump deliver duct and having its smaller base situated near the outlet of the delivery duct and its larger base near the inlet of the duct joined to the core support;
- a connecting member joined to the sleeve at its smaller base and symmetrical in revolution around the axis of the sleeve, this member carrying in its central portion, near the axis of symmetry, the movable portion of an articulated connection means whose fixed portion is carried by the pump, thus permitting at one and the same time lateral displacements and the retention of the sleeve on the pump duct despite the axial force exerted thereon, while the peripheral portion of the connecting member, which has a diameter larger than the diameter of the smaller base of the sleeve, has a spherical surface, symmetrical around the axis of the sleeve, which is complementary to a corresponding surface machined on the end of the pump delivery duct, fluid-tightness between these two surfaces disposed against one another being achieved with the aid of a labyrinth seal, while the pressure of the liquid metal delivered by the pump, applied to the portion of the connecting member which lies between its peripheral portion and its portion fixed to the sleeve, makes it possible to exert an axially directed force on the sleeve;
- a sealing device inserted between the outlet end of the sleeve and the duct joined to the core support, the end of this device on which the outlet end of the sleeve is engaged being of a different diameter from that of the end of the sleeve;
- an elastic means inserted between the end of the sleeve and a bearing member joined to the core support, this elastic means extending over the entire periphery of the sleeve for the lateral support of the sleeve, the outlet end of which can move freely in the axial direction relative to the duct joined to the core support.

BRIEF DESCRIPTION OF THE DRAWING

In order that the invention may be more clearly understood, a description will now be given, by way of example without limitation, of one embodiment of the junction device according to the invention, for use in the case of an integrated nuclear reactor, for joining the vertically disposed delivery duct of the pump to the duct joined to the bed on which rest the assemblies disposed beneath the pump.

The single FIGURE is a section through a plane of symmetry of the junction device according to the invention, disposed between the bottom part of a primary pump and a duct joined to the core support.

DESCRIPTION OF PREFERRED EMBODIMENT

The drawing shows the bottom portion 1 of the volute casing of a primary pump disposed inside the vessel of a liquid sodium cooled fast neutron nuclear reactor.

The vessel of this nuclear reactor also contains the core support of the reactor, on which are disposed the fuel element assemblies forming the core.

On this core support or bed is fixed a duct for injecting liquid sodium at the base of the assemblies; the inlet end 2 of this duct can be seen in the drawing.

This vertically disposed inlet end 2 leads into a hollow sphere, on which is fixed the outlet portion of the duct joined to the core support. This outlet portion is horizontal and permits the distribution of the sodium to the bottom portion of the core assembly.

The bottom portion of the volute casing 1 is connected at its periphery to a junction ring 4. The bottom portion of the volute casing and this ring 4 constitute the delivery duct of the pump.

The junction device between the pump delivery duct and the inlet portion 2 of the duct joined to the core support is composed of a sleeve 6, a connecting member 7 disposed at the pump delivery duct end, and a sealing and retaining assembly 8 disposed at the end adjoining the duct joined to the bed.

The entire junction device is symmetrical in revolution about the vertical axis 5 of the pump.

The connecting member 7 is welded to the smaller base of the frusto-conical sleeve 6, at a point near the pump delivery duct.

This connecting member 7 has a peripheral portion 9 machined to form a spherical surface complementary to a spherical surface machined on the outer surface of the ring 4.

These two spherical surfaces in contact with one another assure leak-tightness at the junction between the pump delivery duct and the sleeve with the aid of a labyrinth seal 10 disposed between the connecting member 7 and the ring 4.

The connecting member 7 also has a central portion connected to the peripheral portion by means of a crosspiece 12.

This central portion is composed of the movable portion 14 of a ball joint whose fixed portion 6 is carried by the bottom portion of the pump volute casing in its central portion, near the axis of symmetry 5. The shaft 15 of this ball joint is fixed to the threaded central portion of the fixed portion 6 of the joint.

The frusto-conical sleeve 6 widens out from its inlet end near the outlet of the delivery duct towards its outlet end near the inlet end of the duct joined to the bed.

The sealing and retaining assembly 8 is fixed to the end of the sleeve 6, at the larger base of the latter, and is provided with a ring on which are fixed, on the one hand, frusto-conical elastic sectors 16 carrying at their ends spherical bearing surfaces 17 and, on the other hand, an assembly of sealing segments 18.

The end of the sleeve 6 and the ring 9 penetrate inside the inlet of the duct 2, which has a diameter greater than the diameter of the larger base of the sleeve 6.

The segments 18 are inserted between the ring 8 and the inner surface of the duct 2, while the elastic sectors 16 bear through the spherical portions 17 against the surfaces locally machined to a spherical shape and integral with the duct 2.

It can be seen that the outlet end of the sleeve 6 and the ring 8 are free to move in the direction of the axis 5 inside the inlet of the duct 2.

When liquid sodium is circulating inside the sleeve 6 at the outlet of the pump delivery duct, the excess pressure of this sodium in relation to the sodium contained in the vessel gives rise to forces applied to the wall of the sleeve, the resultant of these forces being a force axially directed toward the pump. The central joint connection 6, 14 enables this axial force to be resisted.

In addition, between the peripheral portion of the connecting member 7 and the junction portion of this member on the sleeve 6, at the smaller base of the latter, an annular surface 20 exists which is perpendicular to the axis 5 and to which is applied the pressure of the liquid sodium delivered by the pump.

This pressure produces an axial force opposed to the force produced by the pressure of the sodium inside the sleeve 6.

In the embodiment illustrated in the drawing, these two forces cancel one another, so that during the operation of the pump the equilibrium of the sleeve is completely stable in the axial direction.

The transverse forces applied to the junction device may give rise to a displacement of the latter, so that it will assume an inclination relative to the axis 5.

The arrangement of the articulated connections permits this displacement, and the complementary sealing surfaces carried by the sleeve and the ducts to which the sleeve is connected enable these displacements to be made while assuring perfect continuity of flow of the liquid sodium.

The junction device therefore undergoes no excessive stresses either in the axial direction or in the transverse directions. Nevertheless, the junction is always maintained perfectly.

In addition, both longitudinal and transversal expansions are possible without the subjection of the junction device to any considerable stresses.

The transverse displacements are moreover limited by the elasticity of the sectors 16 completely surrounding the end of the sleeve and assuring the recentering and lateral retention of the latter.

A frusto-conical insertion slope 21 permits easy mounting of the sleeve inside the duct 2.

It can be seen that the main advantages of the device according to the invention are the fact that it permits a perfect junction between the pump delivery duct and the duct joined to the core support bed of the reactor, while permitting expansions and displacements of this junction device through the action of various stresses, and thus preventing overstresses.

Moreover, the balancing of axial forces is possible by modifying the diameter of the peripheral portion of the connecting member 7.

It is thus possible to obtain a completely balanced system like the one described above, or else to obtain a system in which the resultant of the axial forces is directed towards the pump or else directed towards the bed.

The suspension and attachment of the junction device by an articulated connection disposed in its central portion permit displacement under the action of transverse forces, while assuring perfect support of the junction device in the longitudinal direction.

The invention is not limited to the embodiment described above, but on the contrary includes all variants.

Thus, for the articulated device for securing the sleeve to the pump delivery duct, it is possible to use an articulated connection means other than a ball joint.

It is also possible to conceive the construction of the connecting member 7 in a different form, while the balancing surface 20 of the sleeve could have a shape differing from the annular shape.

It is likewise possible to conceive a different form of construction of the sealing and retention assembly 8, and the elastic device inserted between the end of the sleeve and the bed could be made in a form different from an assembly of frusto-conical sectors.

Finally, the junction device according to the invention can be used in all cases where a primary pump of a liquid metal cooled fast neutron nuclear reactor is used for injecting this liquid metal into a duct joined to a fixed part of the reactor.

We claim:

1. A junction device between the delivery duct of a primary pump and a duct joined to the core support of a liquid metal cooled fast neutron nuclear reactor, in which the liquid metal constituting the primary fluid of said reactor is pumped to the base of the core of said reactor by primary pumps which inject the liquid metal into ducts joined to said core support for the purpose of cooling said core, comprising
   (a) a frusto-conical sleeve (6) disposed as an extension of said pump delivery duct and having its smaller base situated near the outlet of said delivery duct and its larger base near the inlet of said duct (2) joined to said core support;
   (b) a connecting member (7) joined to said sleeve (6) to its smaller base and symmetrical in revolution around the axis of said sleeve (6), said connecting member carrying in its central portion, near the axis of symmetry (5), a movable portion (14) of an articulated connection means the fixed portion (16) of which is fixed on said pump duct, thus permitting simultaneously lateral displacements and the retention of said sleeve (6) on said pump duct against axial forces, while the peripheral portion of said connecting member (7), which has a diameter larger than the diameter of said smaller base of said sleeve (6), has a spherical surface (9), symmetrical around the axis (5) of said sleeve (6), which is complementary to a corresponding surface machined on a piece (4) rigidly fixed on the end of said pump delivery duct, fluid-tightness between these two surfaces disposed against one another being achieved with the aid of a labyrinth seal (10), while the pressure of the liquid metal delivered by said pump, applied to the portion of said connecting member (7) which is located between its peripheral portion and its portion fixed to said sleeve (6), enables exertion of an axially directed force on sleeve (6);
   (c) a sealing device (18) inserted between the outlet end of said sleeve (6) and said duct (2) joined to said core support, the end of said sealing device on which the outlet end of said sleeve (6) is engaged having a diameter different from that of the end of said sleeve; and
   (d) an elastic means (16) inserted between the end of said sleeve (6) and a support member fastened to said core support, said elastic means extending over the entire periphery of said sleeve (6) for the lateral support thereof, the outlet end of said sleeve being freely movable in the axial direction relative to said duct (2) joined to said core support.

2. A junction device as claimed in claim 1, wherein said elastic means (16) is composed of an assembly of frusto-conical sensors joined to said sleeve (6) at one of their ends and at their other end carry a spherical support member (17) contacting a corresponding spherical surface on said support member.

3. A junction device as claimed in claim 1 or 2, wherein said articulated connection means comprises a ball joint (14, 16) whose axis of rotation (15) is parallel to said axis of symmetry (5).

* * * * *